United States Patent [19]

Knudsen

[11] Patent Number: 4,688,045

[45] Date of Patent: Aug. 18, 1987

[54] DIGITAL DELAY GENERATOR FOR SONAR AND RADAR BEAM FORMERS

[76] Inventor: Donald C. Knudsen, P.O. Box 929, Stittsville, Ontario, Canada, K0A 3G0

[21] Appl. No.: 839,929

[22] Filed: Mar. 17, 1986

[30] Foreign Application Priority Data

Mar. 21, 1985 [CA] Canada .................................. 477158

[51] Int. Cl.[4] .......................... H01Q 3/00; G01S 3/80

[52] U.S. Cl. .................................... 342/377; 342/375; 367/123

[58] Field of Search ............... 342/377, 375, 372, 360; 364/456; 367/103, 123, 138

[56] References Cited

U.S. PATENT DOCUMENTS

| | | | |
|---|---|---|---|
| 3,869,693 | 3/1975 | Jones | 342/375 |
| 4,166,274 | 8/1979 | Reudink et al. | 342/377 |
| 4,166,999 | 9/1979 | Brady, III | 367/105 |
| 4,217,587 | 8/1980 | Jacomini | 342/377 |
| 4,232,380 | 11/1980 | Caron et al. | 367/88 |
| 4,277,787 | 7/1981 | King | 342/377 |
| 4,292,634 | 9/1981 | Wu et al. | 342/189 |
| 4,353,119 | 10/1982 | Daniel et al. | 342/379 |
| 4,445,119 | 4/1984 | Works | 342/377 |
| 4,489,325 | 12/1984 | Bauck et al. | 342/376 |

*Primary Examiner*—Theodore M. Blum

*Assistant Examiner*—David Cain

*Attorney, Agent, or Firm*—Edward E. Pascal

[57] ABSTRACT

This invention relates to apparatus and a method of controlling the amount of delay or phase-shift which is applied to a signal received at or transmitted from each transducer in a multi-transducer antenna to produce a beam directed at a specific target point. For each transducer a first look-up table is used for storing first digital words representative of the included angle between the lines joining the target to a reference point, and the same reference point to a transducer. A second look-up table is associated with the first look-up table for each transducer, and stores second digital words representing delay or phase-shift control signals corresponding to ranges of the target relative to the reference point for each of said first digital words. Each first look-up table is addressed with an address signal representing the direction of the line from the reference point to the target, to obtain a corresponding first digital word. Each second look-up table is addressed with a corresponding first digital word combined with a signal representing the range of the target to obtain a corresponding second digital word. A signal received or transmitted by the corresponding transducer is delayed or phase-shifted an amount represented by the second digital word.

16 Claims, 6 Drawing Figures

Figure 1:
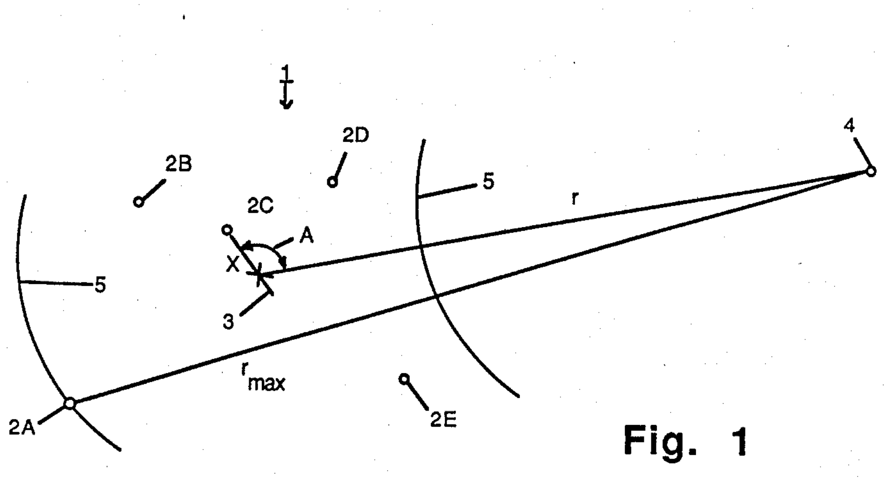

Fig. 3
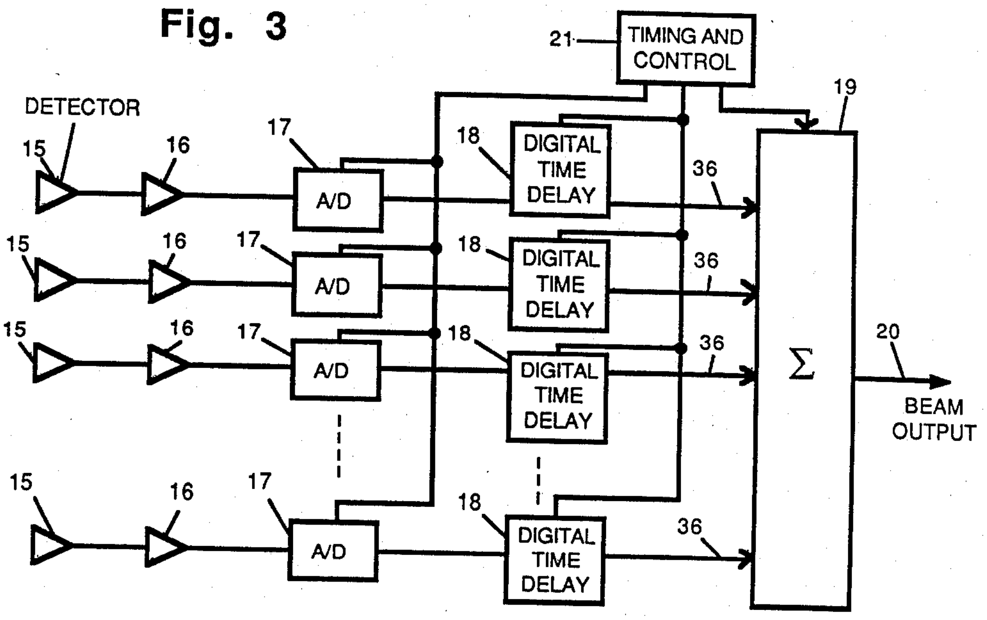
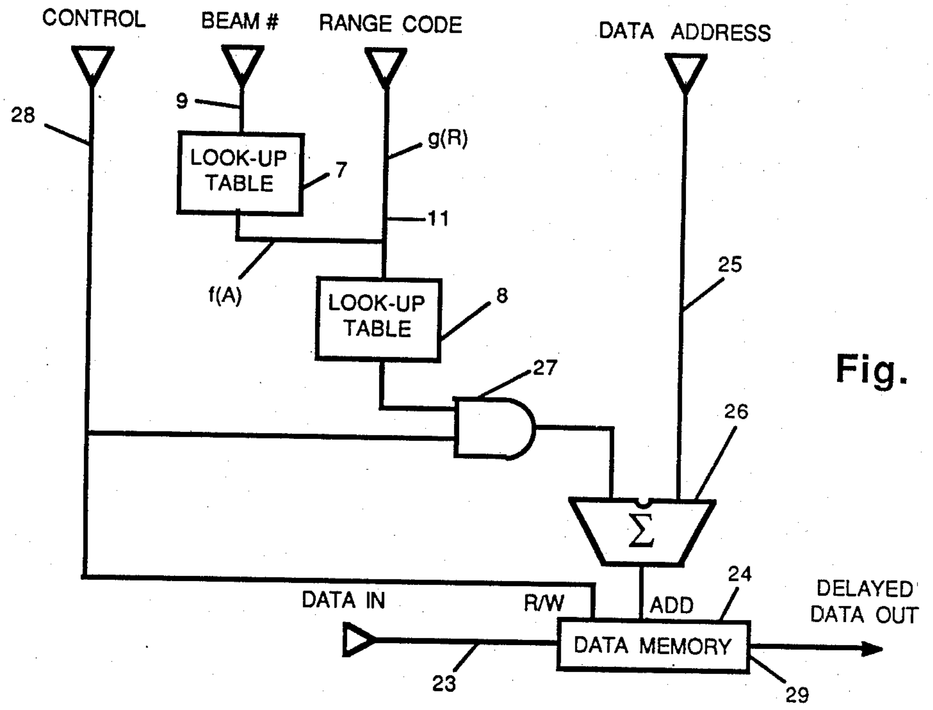
Fig. 4

DIGITAL DELAY GENERATOR FOR SONAR AND RADAR BEAM FORMERS

This invention relates to electronically steered antennas such are used in sonar and radar systems, and particularly to an antenna beamformer for use in a multi-transducer array antenna.

A signal to be received from a specific source has a spherical wave front which is received by various transducers of a multi-transducer antenna at different instants in time. In order to correlate the signal wave front received by each transducer, the signals received by each transducer must be phase-shifted or time delayed. The delayed signals are then summed to form an output signal. The amount of time delay or phase shift introduced at each transducer is a parameter which is directly related to the radial distance from the specified source to the particular transducer. The antenna can be steered to any point in the object field by changing the delays which are applied to the signals at each transducer.

The implementation of a practical beam former using time delays of the signals received from each of the transducers and summing the result has proven to be a difficult problem. One of the major difficulties has been the lack of a satisfactory means for delaying the transducer signals individually by precise and controllable amounts. There are two aspects to this problem: the delay apparatus, and the delay control apparatus. This invention relates to the latter. The delay control apparatus is that part of a beam former which determines and controls the exact amount of delay which must be introduced at each transducer in order to steer the beam to a specified point in the object field.

A variety of electronic delay mechanisms have been tried or proposed, including analog delay lines, and charge coupled device analog shift registers. More recently, digital storage circuits such as semiconductor random access memories have been used as delay elements because of the large number of samples they can hold and the very fine delay resolution which can therefore be achieved. Regardless of the delay mechanism employed, however, the problem remains of determining the correct amount of delay to introduce in each case. The required delays are functions of the distances between each transducer and each point in the object field. In the general case of a three-dimensional transducer array with arbitrary, but known, transducer locations, and a three-dimensional object field, determination of the delay values involves a large number of moderately difficult computations.

This problem is usually minimised by restricting the array geometry in such a manner that symmetry and/or repetitiveness in the detector locations introduces a high degree of redundancy into the delay computations. The most obvious example of restricted geometry is the linear array with equally spaced elements. There are two significant disadvantages to restricting array geometry: the positions of the transducer elements must be a compromise between beam former design requirements and antenna performance considerations, and performance will inevitably suffer as a result, and the resulting beam former can only be used with arrays of the specific geometry for which the beam former was designed.

Another common method of increasing the degree of redundancy in the delay computations is to assume that all signals of interest originate sufficiently far from the detector array that their wave fronts are essentially planar across the aperture of the array. The disadvantage of this approach is that the antenna is incapable of focusing and is thus restricted to far-field targets. Although not a significant limitation for small aperture, low performance sonars, this inability to focus on near-field targets is unacceptable in large aperture, high resolution applications.

The redundancies introduced by the combination of restricted array geometry and the far-field approximation can reduce the quantity and complexity of delay computations considerably. For a few very simple array geometries, such as the linear array of equally spaced transducers, the computational requirements are negligible.

Another approach to the problem of delay value determination, which does not restrict array geometry or aperture, employs the general purpose digital computer. The detector signals are digitized and loaded into computer memory where the beam forming operation is performed entirely in software, usually in the frequency domain using Fourier transform techniques. Although offering unparalleled flexibility, this approach is unacceptably slow for many real time beam forming applications.

It is possible to pre-compute the delay values for each transducer for all possible points in the object field and store the results in look-up tables, one for each transducer, where they can be accessed very rapidly as required. This approach combines the flexibility of the general purpose computer with the speed of a dedicated hardware beam former, but it has the disadvantage that a three-dimensional object field with acceptable spatial resolution requires excessively large look-up tables. Thus for example to provide an acoustic imaging system with an object field of 128 pixels by 128 lines and the ability to focus at 64 different ranges, a look-up table for each transducer in such a system would have to contain 1,048,576 words. Clearly the memory requirements for such digital systems are extremely great.

An example of a beam former using precomputed delay values stored in digital look-up tables is described by Petersen and Kino in "Real-time Digital Image Reconstruction: A Description of Imaging Hardware and an Analysis of Quatization Errors", IEEE Transactions on Sonics and Ultrasonics, Volume SV-31, Number 4, July, 1984, pp. 337-351. In this beam former the delay values are stored in a high-speed look-up table called a "focus map".

In these and all other known examples of beam former designs using pre-computed delay values stored in digital look-up tables, the array geometry is restricted in order to take advantage of symmetry and repetitiveness. The redundancy thus introduced into the delay computations reduces the size of the look-up table to manageable proportions. No prior example is known of a beam former using stored, pre-computed delay values for a three-dimensional transducer array of arbitrary geometry, to image a high-resolution, three-dimensional object field.

The present invention is a beam former apparatus which uses precomputed beam steering information stored in digital look-up tables to control the time delays introduced at each transducer of three-dimensional transducer array with arbitrary but known geometry to image a three-dimensional object field with high spatial resolution, and high speed (operating in real time), yet using substantially reduced memory from that required in the aforenoted prior art approach. For the case of an image field of 128 pixels by 128 lines, focusing at 64 different ranges, rather than more than 1,000,000 digital delay words previously required for each of the transducers, the present invention requires only two memories, each storing 16,384 words. This clearly represents a substantial memory reduction over the prior art system. In a system to be described below, it has been found that depending on the duty cycle (the number of read cycles for every write cycle) beam output rates as high as 10,000,000 per second can easily be obtained.

In the present invention the look-up operation is partitioned in such a way that the excessively large look-up table previously required for each transducer can be replaced with two very much smaller look-up tables in a cascade configuration, thus providing a substantial net reduction in the total amount of look-up table memory required for each transducer.

The partitioning scheme utilizes the principle that the location of any point in three-dimensional object space can be fully defined by two direction coordinates and one range coordinate. Specifically, each target point can be defined by its distance (the target range) from a predetermined reference point, and by the direction (two coordinates) of the line from the reference point to the target. However, it can be shown that the beam-steering delay required at a particular transducer is a function only of the target range and the angle between the lines joining the predetermined reference point to the particular transducer and to the target, and is independent of the actual target direction. Thus the two direction coordinates of each object point can be replaced with a single parameter (for each transducer): the angle between the lines joining the predetermined reference point to the particular transducer and to the target. This angle, which is in general unique to each transducer and each target point, is sufficient to specify the required delay for any given value of target range.

Thus in the present invention, the first look-up table for each transducer transforms the two target direction coordinates into a digital representation of the angle between the lines joining the predetermined reference point to the particular transducer and to the target, and the second look-up table for each transducer transforms the digital value produced by the first look-up table for the transducer, together with the target range, into a digital delay control signal.

The present invention is a beam former control apparatus for a multi-transducer array antenna comprising a delay circuit for generating a delay or phase shift control signal for the signal received from (or, reciprocally, transmitted to) each transducer. Each delay circuit is comprised of a pair of look-up tables, the first look-up table receiving one or a pair of signals which specifies the direction of the beam. The input signals are representative of an address in the look-up table. The word which is read from the address in the first look-up table is output to the second look-up table. That signal, in combination with a second input signal which is representative of the range of the target, forms an address to the second look-up table. A word stored at the address of the second look-up table is output therefrom, and represents a delay, i.e. constitutes a delay control signal for the associated transducer for delaying the received signal prior to being summed in a summer with the separately delayed signals of the other transducers. In the case of a transmitting antenna, it controls the delay of the signal prior to being applied to the corresponding transmitting transducer. More generally, in accordance with one embodiment of the invention, each delay circuit is comprised of a first digital apparatus for receiving one or a pair of signals representative of a target direction relative to a predetermined reference point, which provides in response thereto a first signal representing a function of an included angle between lines joining the reference point to the corresponding transducer and the reference point to the target, and second digital apparatus in circuit communication with the first digital apparatus for receiving the first signal and a second signal representative of the range of the target relative to the reference point, and for providing in response thereto an output signal corresponding to the control signal.

In accordance with another embodiment of the invention, a multi-transducer array antenna is comprised of a plurality of digital time delay apparatus, one corresponding to each transducer for delaying transmission of a signal traversing therethrough, and including a delay control input. Analog-to-digital converter apparatus is connected to each transducer for receiving an output signal therefrom, having an output connected to an input of a corresponding time delay apparatus. A summer has inputs connected to corresponding outputs of the time delay apparatus, for receiving variously delayed output signals of the transducers and for providing a beam output signal of the antenna. Control apparatus controls the time delay of each time delay apparatus. Each control apparatus is comprised of a first look-up table for receiving a signal representative of the direction of the line joining the target to a predetermined reference point as an address, and for outputting in response thereto a first signal, stored at the address, representative of an included angle between lines joining the corresponding transducer to the reference point, and the reference point to the target of the corresponding transducer. A second look-up table receives the first signal and a second signal representative of the range of the target relative to the reference point as an address and outputs in response thereto a delay control signal stored at the address. The delay control signal is applied to a corresponding delay control input of a corresponding delay apparatus for controlling the delay of transmission of the signal from the corresponding transducer therethrough. Of course the look-up table can be combined into a single memory if the address requirements are dealt with in accordance with the art.

The signals representative of the direction and of the range of the target are provided from an external source which does not form part of this invention (e.g. from a manual control panel) and can simply be digitally converted signals corresponding to d.c. voltages established by a potentiometer connected across a d.c. power source, or equivalent apparatus. The transducers can be typically hydrophones in a sonar system, array elements of a radar antenna, etc.

Figure 2:
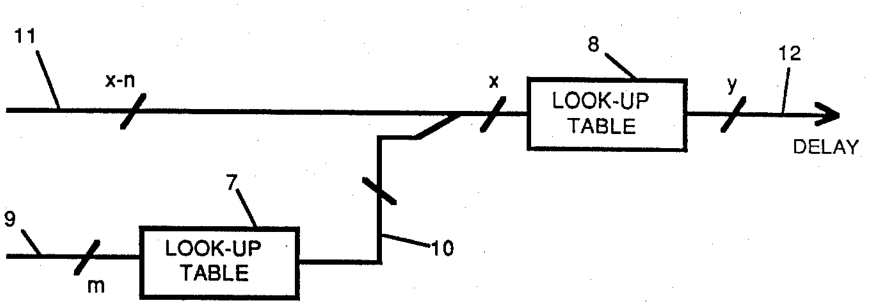
Figure 5:
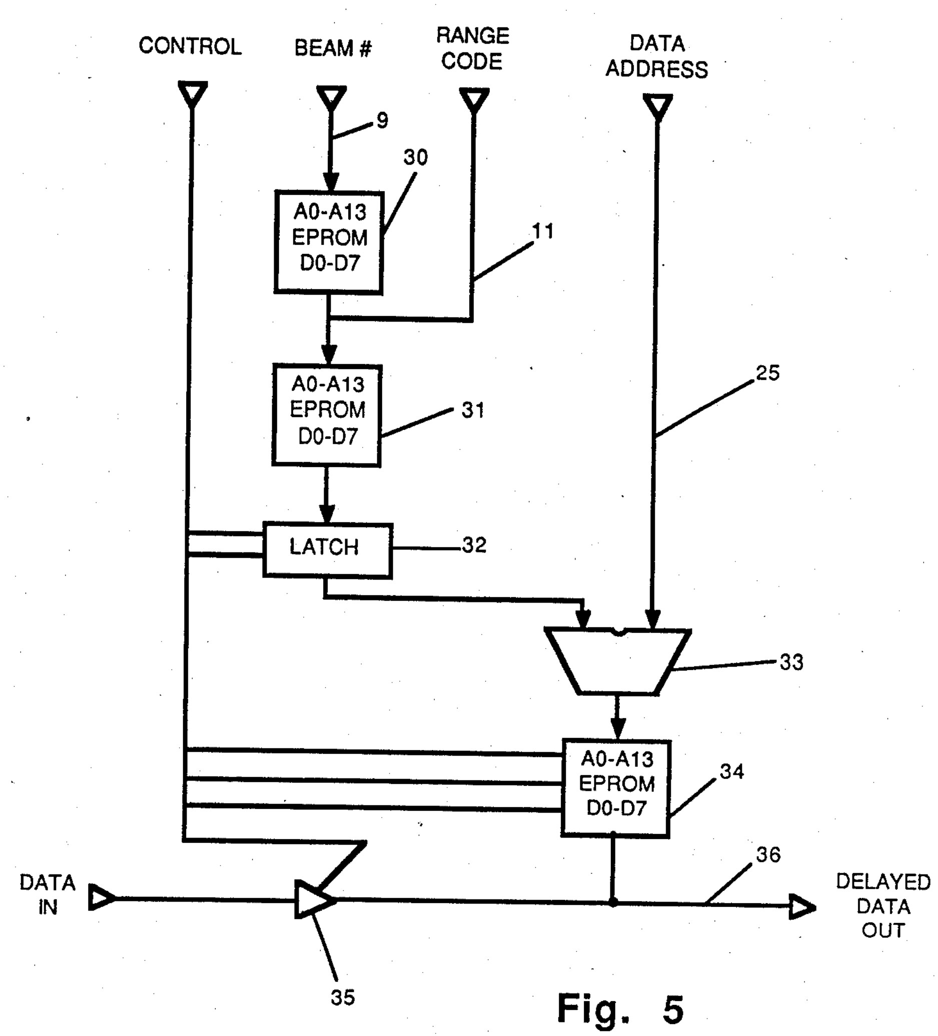
Figure 6:
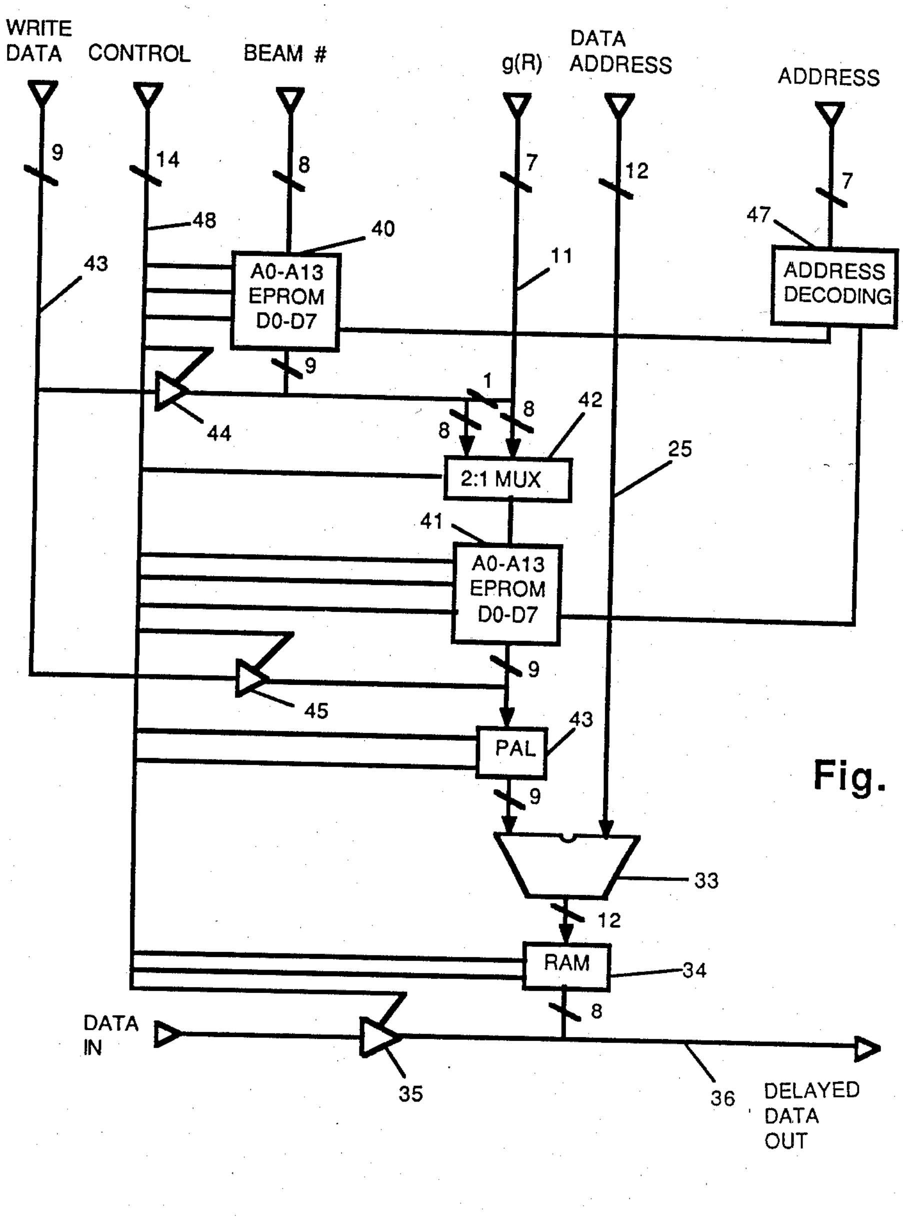

A better understanding of the present invention will be obtained by reference to the detailed description below, in conjunction with the following drawings, in which:

FIG. 1 is a schematic drawing illustrating the basic principles of a beam former, FIG. 2 is a block diagram illustrating the basic concepts of the present invention, FIG. 3 is a block diagram of a beam former which utilizes the present invention, FIG. 4 is a block schematic diagram of one embodiment of the invention which can be used in the configuration of FIG. 3, FIG. 5 is a schematic of an embodiment of the invention, and FIG. 6 is a schematic of another embodiment of the invention.

Turning to FIG. 1, the basic concept of the multi-transducer antenna beam former is illustrated. An antenna 1 is formed of representative transducer 2A–2E which for purposes of illustration are arranged in a single plane. A reference point 3 and a target 4 are for illustration purposes located in the same plane as the transducers. The target 4 is a source of signals to be received (in the receiving case) which could be generating the signals or reflecting or scattering signals generated elsewhere. The speed of propagation in the medium is assumed to be the same at all points and in all directions, so the signals travel with spherical wavefronts from the target, as illustrated by line 5.

Clearly each wave front is interrupted by transducer 2E and 2D before being interrupted by transducer 2C which is earlier than the time that the same wave front is intercepted by transducers 2B and 2A. In order to correlate the signals from all transducers, the signals from transducers closer to the target must be delayed by amounts equal to the additional travel time that it takes the same wavefront to reach the transducer most distant from the target. The travel time from the target to any transducer is equal to the distance between the target and the transducer divided by the propagation speed in the medium. The required delays can therefore be expressed in terms of the array and object field geometry. With reference to FIG. 1, the delay required at transducer 2C is defined by the expression:

$$\text{delay}=(r_{max}-r)/c$$

where

- $r_{max}$ is a reference distance equal or greater than the distance between the target and the most distant transducer in the array,
- r is the distance between the target and transducer 2C, and
- c is the propagation speed of the received signal in the medium in which it travels, The simplicity of this expression is deceptive, because in general r is not known explicitly, but must be computed or otherwise determined for each transducer from the known transducer and target coordinates every time a new target is selected. Furthermore, although the example was illustrated in two-dimensions, object fields are often three-dimensional, and may contain thousands of resolvable target points. The time required to perform these computations is particularly critical in real-time tracking, scanning and video applications which require the ability to change the steering delays very rapidly and frequently.

As was mentioned earlier, one way of achieving the above is to provide a transducer time delay control for each transducer comprising a memory which contains a look-up table for the time delay for each elemental position in three-dimensional object space for translation of the signal from each transducer. Thus for an object field of 128 pixels by 128 lines, and at 64 different ranges, the look-up table for each detector would have to contain 1,048,576 entries.

Instead, according to the present invention, a delay control apparatus is used for each detector as shown in FIG. 2. In the present invention a pair of look-up tables 7 and 8 are used. An m bit address signal is applied to the m address lines 9 of look-up table 7, which address signal is representative of the beam direction for an associated transducer. A resultant output signal on the n output lines 10 of look-up table 7 is applied to n address input lines of look-up table 8. At the same time a range signal made up of x-n bits is applied to x-n address lines 11 which are input to look-up table 8. The resulting y bit output signal (with fewer number of bits than x) from look-up table 8 on y lines 12 represents the delay to be applied to the signal received from the associated detector array before summing with the signals from the other arrays (or alternatively applied to the signal to be transmitted from a corresponding transducer prior to being applied to that transducer).

The input signal on input lines 9 represents beam direction. In the two-dimensional example of FIG. 1, this direction could be specified by a single parameter, for example, the angle (from the horizontal) of the line between the target 4 and the reference point 3. In the general three-dimensional case two coordinates, azimuth and elevation for example, are required to unambiguously specify the beam direction.

In one example, the azimuth input signal to look-up table 7 could be formed of a 7 bit word. The corresponding elevation input would be similarly formed of a 7 bit word. Thus the address to look-up table 7 would be 14 bits. Yet the output word from look-up table 7 which is the function of the angle of A could be specified with e.g. 8 bits, an overall reduction of six bits or a factor of 64.

The output word is applied as part of an address signal to look-up table 8. The remainder of the address signal, representative of the range of the target is applied on input lines 11. The word representing the range would typically be 6 bits. Consequently the address of look-up table 8 would be 14 bits.

The addressed delay control data stored in look-up table 8, is output on lines 12, would be e.g. 8 bits, a substantial reduction from the input address word length. This output signal constitutes the delay control, with sufficient bit length to define the required resolution.

The look-up tables used in this example contain $2^{14}$ (16,384) words each, for a total of 32,768 words, a substantial reduction from the 1,048,576 entries in the prior art approach.

The geometric basis for the present invention can be illustrated by rewriting the delay expression developed above in slightly different form. Referring again to FIG. 1, the required delays can conveniently be specified relative to the time of arrival of the wave front at a real or hypothetical transducer located at the reference point 3. Recalling that the distance from the reference point 3 to the target 4 is defined as the target range, the amount of delay which must be applied to the signals from transducer 2C is equal to:

$$\text{delay}=d_{ref}+(R-r)/c$$

where

- $d_{ref}$ is the delay required at reference point 3, and
- R is the target range.

The plane triangle formed by the target, the reference point and transducer 2C can be solved for r to permit the delay expression to be written as:

$$\text{delay} = d_{ref} + [R - (R^2 + x^2 - 2Rx\cos A)^{\frac{1}{2}}]/c$$

where

A is the angle between the lines joining the reference point to the target point and to transducer 2C, and x is the distance between the transducer and the reference point.

Note that although illustrated in two-dimensions, this expression is fully valid in three-dimensional space.

The significance of this form of the delay expression is that, for any given transducer, the beamsteering delay is a function of only two variable parameters, R and A. Furthermore, the angle A is uniquely specified for any given transducer by the beam direction (the direction of the line from the reference point to the target point), and by the transducer location, and is independent of target range R. Thus, the two beam direction coordinates (e.g. pixel and line, or azimuth and elevation) can be transformed into a single intermediate parameter (A), quite independently of the range coordinate (R), thereby reducing the three-dimensional look-up operation to two, cascaded two-dimensional look-up operations. The delay signal has thus been transformed from a three-dimensional problem to a two-dimensional problem, requiring substantially reduced memory relative to a three-dimensional parameter storage memory.

Look-up tables 7 and 8 can be random access memories. A single chip 128k memory used for look-up table 7, for example type 27128, can accommodate a total of 16,384 distinct beam direction words. This is sufficient for an image field of 128 pixels by 128 pixels or 360 increments in azimuth by 45 in elevation. In the worst case (full spherical coverage) this size memory is capable of providing two degree resolution in both azimuth and elevation, although defining the beams in this manner may not be the most efficient use of look-up table addresses, if the criterion is uniform angular coverage of the object field. It should be noted that the address code can be regarded simply as a listing of the beam directions, in any convenient order (for example, a raster scan sequence), and the beams can be randomly accessed.

The address field of the 27128 memory chip is 14 bits wide. A similar memory chip can also be used for look-up table 8. Since 8 bits of the input address to look-up table 8 are used to specify the function of the angle A (the output from look-up table 7) 6 bits are available for range data (x-n). The most efficient coding scheme is one which produces a uniform distribution of delay errors from infinity to the minimum distance at which the beam former can focus.

The effect of range resolution on the delay determination is highly non-linear, ranging from very large in the near field to insignificant in the far field. An unencoded range input would require a wastefully large look-up table address word length to provide acceptable resolution for near field target. For that reason it is desirable to increase the number of words stored for the near field ranges and decrease the number of ranges for the far field, i.e., inverse to the non-linearity.

Thus each time delay control circuit is identical, except for the data stored at each memory location of the look-up tables.

FIG. 3 is a block diagram of a digital time delay and sum beam former. Transducers 15 intercept the signals to be received from the target. The received signals pass through associated amplifiers 16 and the amplified signals are respectively applied to analog-to-digital converters 17. Here the signals are converted to digital form, and are then applied to controllable time delay circuits 18. After being time delayed, the digitized signals from the transducers are applied to inputs of a summer 19, the output thereof being the beam output signal of the antenna, on transmission path 20. A timing and control circuit 21 controls the time delay in delay circuits 18, as well as the operation of analog-to-digital converter 17 and summer 19. The timing and control circuit 21 applies control signals to time delay circuits 18 to achieve electrical steering (beamforming) of the antenna to fulfill the delay characteristics required to identify the unique position in three dimensional space defined by the position of target 4 as described above with respect to FIG. 1, within the resolution capability of the antenna.

FIG. 4 illustrates the time delay circuitry, contained within each block of delay circuit 18 in FIG. 3. Look-up table 7, receives a beam direction signal on input address lines 9. The address can be specified merely as a predefined beam number, which has been pre-standardized to represent a certain direction.

The output signal of look-up table 7 is applied via output lines 10, with a range address signal from input lines 11, to the address inputs of look-up table 8. The range input signal could alternatively be represented as a range code which has been predefined to represent a predetermined range. The range code and output signal of look-up table 7 together form an address input to look-up table 8, which in response outputs a delay control signal on output line 12.

The digitized signal received from the target via a transducer 15 is applied via input data line 23 to the data port DIN of a data memory 24. The write address to be added to the output data signal word from look-up table 8 is received on data address lines 25, which lines are connected to an input of a summer 26. The output signal of summer 26 is applied to the address input of data memory 24.

Preferably the data address source signals are generated in a counter which merely increments the address location for writing the input data from the transducer carried on data lines 23. Indeed, it is preferred that data memory 24 should be a rotating buffer which merely writes the data sequentially from one end of the memory to the other, starting again at the beginning, overwriting the old data once the end of the memory has been reached.

The delay signal from look-up table 8 is passed through AND gate 27, to the other input of summer 26. The second input of AND gate 27 is connected to a control input 28, which is also connected to the read-write R/W input of data memory 24. The delayed input data is obtained at the data output line 29 from data memory 24. The delayed data output line 29 of each data memory is connected to a corresponding one of the inputs of summer 19 (FIG. 3).

In operation, external controller circuitry (not forming part of this invention) implements a write cycle. A write pulse is received at control line 28, connected to the R/W terminal of the data memory, and sets the data memory 24 to its write mode. At the same time AND gate 27 is inhibited. The data being received o input lines 23 from an associated transducer is written to the data memory 24 at the address specified by the signals on data address source lines 25.

Assuming that data memory 24 has been filled with data from previous cycles, the data address increments, and the control input 28 switches to a read cycle. AND gate 27 is enabled, allowing the output data from look-up table 8 to pass through into summer 26. The address of the data on line 25 is thus incremented by the value of the output data from look-up table 8. The read address of data memory 24 is thus an increment from that address which has just been written to, the increment representing a delay.

In this manner read and write cycles are time multiplexed; it is preferable that there should be several read cycles typically taking place for each write cycle. The beam output rate is thus made entirely independent of sample data input rate. The sample rate is determined by beam forming time-delay resolution requirements, rather than by sampling theory, and is normally much higher than the Nyquist rate.

The time delay of a particular output sample is simply the difference between the read address and the write address multiplied by the sampling interval. It should be noted that it is the relative delay between the signals of the transducers, rather than the absolute amount of delay, that is important to beam forming.

The minimum capacity of the data memory, in terms of the number of samples it will hold, is determined by the sampling rate and the maximum delay required, which is a function of the ray geometry and steering angles. In practice a much larger data memory should be used so that several samples of each beam (in time sequence snap-shots) can be obtained without having to wait for new data.

The word size of the data memory can be as small as one bit, and in which case simple hard limiting circuits can be used instead of the analog-to-digital converters, or can be as large as desired. The choice of word size would normally depend on sonar or radar performance considerations rather than on beam former technology limitations.

It should also be noted that the beam number (direction) range code (range), the data address and the various control signals are generated externally and are common to all delay circuits in the system. The only difference between circuits associated with each transducer is the data stored in the look-up tables.

The adder 26 performs the functions of offsetting the delay relative to the current write address so that none of the delay values overlap the boundary between the old and the new data, and permits the controller to step through a time sequence of "snap-shots" of each beam.

Turning to FIG. 5, an actual circuit implementation of the block diagram of FIG. 4 is shown. The eraseable programmable read-only-memories (EPROM) 30 and 31, each preferably type 27128 (128k) are used as look-up tables 7 and 8. The 14 address input ports $A_0$–$A_{13}$ receive the beam number word or pair of words. The 8 data output ports $D_0$–$D_7$ of EPROM 30 are connected to 8 address lines of EPROM 31, while 6 input lines which carry the range code are connected to the remaining address ports of EPROM 31, thus supplying a 14 bit address signal to ports $A_0$–$A_{13}$.

The 8 data output ports $D_0$–$D_7$ of EPROM 31 (look-up table 8) are connected to the input of a type 273 latch 32. The output of latch 32 is connected to an input of a type 283 summer 33. Latch 32 performs the function of AND gate 27 (FIG. 4), and improves system speed by removing the look-up table access time from the data memory timing cycle. This is a benefit because the data memory would normally be accessed many times more frequently than the look-up table.

The data address signal (e.g. 11 bit) is applied to the other input port of summer 33 via lines 25, and the 11 bit output port of summer 33 is connected to the address ports $A_0$–$A_{10}$ of data memory 34. Data memory 34 can be a 2k×8 static random access memory (RAM).

The digitized input data from the transducer is passed through tri-state buffer 35, and is applied to the data ports $D_0$–$D_7$ of data memory 34. The same port is used to read the delayed output data to output line 36.

The memories 30 and 31 could of course be larger, e.g. 512k to increase resolution, and as memory cost reduces, this would be desirable. Each memory as described is organized as 16,382 8 bit words, and thus memory 30 can accommodate a total of 16,384 distinct beam directions, which as noted earlier is sufficient for an image field of 128 pixels by 128 pixels, or 360 increments in azimuth by 45 in elevation. Memory 31 produces an 8 bit delay value.

The remaining control lines for each of the memories (e.g. $\overline{CS}$, $\overline{WE}$, etc.) are well known by persons skilled in the art and need not be described in detail.

Turning to FIG. 6, another embodiment of the present invention is shown. In this embodiment, the look-up tables are implemented using dynamic random access memories (DRAMs) 40 and 41. Each memory has the capacity of 64k words by 9 bits per word. DRAM 40 is addressed similarly to memory 30 in the embodiment of FIG. 5. However its data output lines $D_0$–$D_8$ are connected to one group of inputs of a 2:1 multiplexer 42 with the range code data, lines 11 being connected to the other group of inputs. The output port of multiplexer 42 is connected to the address inputs $A_0$–$A_7$ of DRAM 41. The data output lines $D_0$–$D_8$ of DRAM 41 are connected to the inputs of latch 43, and the outputs of latch 43 are connected to one set of inputs of adder 33. The other set of inputs of adder 33 is connected to the data address source lines 25, similar to the embodiment of FIG. 5. The output of adder 33 is connected to the address inputs of random access memory 34 which, in this case, is a 4k word×8 bit RAM.

The above-described circuit operates similarly as the circuit of FIG. 5, except for the use of a multiplexer 42 for combining the output 9 bit signal of DRAM 40 and the 7 bit range signal together to form an 8 bit address word for DRAM 25. However the data stored in dynamic random access memories is volatile; the look-up table data must be downloaded from the system controller whenever the system is powered up. Being able to reload the look-up tables is very advantageous in applications in which the range geometry is slowly changing, such as when the transducers are air-deployed drifting sonobuoys, e.g. used in military submarine locating systems. The use of 1-bit wide memories also permit greater flexibility in look-up table input and output word lengths, but at the expense of greater circuit complexity.

In order to load the memories, data to be written in them is provided on data lines 43 from the external controller. The data lines are connected to the data ports of memory 40 via tri-state buffers 44, and are connected to the data ports $D_0$–$D_8$ of memory 41 via tri-state buffers 45. External control lines are connected to the control inputs of tri-state buffers 44 and 45 via bus 48.

Write address lines 46 carry memory selection signals for DRAMs 40 and 41 from an external controller to an address decoder 47 in which they are decoded. Output lines of decoder 47 are connected to the chip select inputs of random access memories 40 and 41.

To load the random access memories 40 and 41, the data is presented on the write data lines 43, and is passed through either one of tri-state buffer 44 or 45 under control of a buffer enable signal carried by the control bus 48. The memory selection address appears on address bus 46, which is decoded, and a resultant enable signal appears on the chip select input of memory 40. The data is loaded into the address defined by an address signal appearing on the input address lines 9.

The data to be loaded on the memory 41 is passed through the tri-state buffer 45 from the write data lines 43, memory 41 being enabled by a signal appearing on the address bus 46, which is decoded in address decoder 47, and applied to the chip select terminal of memory 41.

The look-up table data to be loaded appears at the data terminals $D_0$–$D_8$ of memory 41 via buffer 45 and is loaded into the memory at addresses specified by address data which passes through tri-state buffer 44 under control of a signal on control bus 48 and address data applied to address lines 11. The address data passes through multiplexer 42 to the address inputs $A_0$–$A_7$ of memory 41. The address data passing through buffer 44 is of course not loaded into memory 40, since memory 40 at this time is inhibited by an inhibit signal appearing at its chip select input, as a result of the signal decoded from address bus 46 in decoder 47.

During normal non-loading operation of the circuit tri-state buffers 44 and 45 are placed in their non-conductive states by control signals on control bus 48. Both memories 40 and 41 are selected by means of an address signal appearing on an address bus 46, and decoded in decoder 47 to form the required chip select signals.

The beam direction selection signal is externally applied to address bus 9. The 9 bit word stored at the addressed location in memory 40 is output at the data outputs $D_0$–$D_8$ of the memory, and appears at one of the input ports of multiplexer 42. At the same time, the 7 bit range signal is externally applied to lines 11, completing the address for memory 41. Multiplexer 42 combines the two signals and applies an 8 bit address signal to the address ports of random access memory 41 which in turn outputs a 9 bit delay signal stored at the address to latch 43. The 9 bit latched signal is applied to one of the ports of adder 33 which combines with the 12 bit data address signal on bus 25, and provides an address signal to random access transducer data memory 34.

An external controller can be designed by a person skilled in the art of controller design to provide the external signal requirements as described above. The remainder of the circuit operates similarly to that described above with respect to FIG. 5.

The delayed transducer data output signal carried by lines 36 from each of the circuits described is applied to digital summer 19 (FIG. 3) where it is added to provide the output signal of the antenna on transmission path 20.

The beam former described herein is inherently suited for expansion. This is accomplished very effectively by designing the basic beam former unit to accommodate a fixed number of transducer channels (64 for example), and expanding by operating two or more units in parallel.

Additional beam formers operating on the same transducer data in parallel can be used to increase the number of beam samples per second (of the same number of beams), or to increase the number of beams at the same beam output rate, or both. In either case a logical place to connect additional beam formers is following the analog-to-digital converters, to avoid functional duplication.

Similarly, two or more beam formers can be paralleled to handle a large number of transducers, although in this case the digital summer would have to be expanded.

The basic delay circuits described above are applicable to transmitting as well as receiving. In a transmitting application the transducer data memory (24 or 34) would be programmed with a suitable waveform (e.g. a chirp) and a digital-to-analog converter followed by a power amplifier would be connected to its output to drive an associated transducer element.

The beam former described above is applicable to either active or passive roles. When employed as a receive beam former in a sonar application, the range code generated by the system controller preferably is increased linearly, with time following each transmit pulse so that the received echoes would always be in focus. In passive receiver applications the range function can be under operator control.

The design is also applicable to phase-shift beam formers. In fact, since fewer bits would normally be required to specify a phase shift than a time delay, the output word length of the second look-up table (reference 8 in FIG. 4) could be reduced.

While the system embodiment described herein is directed to an acoustic sonar application, the system can also be used in radar systems as well, particularly phased array radar systems with a digitally controlled phase shifter. Low frequency radars such as those used for over-the-horizon applications could use the beam former directly in baseband.

The beam former described herein is also fully compatible with systems employing correlation processing of the beam signal output for pulse compression or for detection of coded pulses.

A person understanding this invention may now conceive of variations in design or other embodiments, using the principles described herein. All are considered to be within the sphere and scope of this invention as defined in the claims appended hereto.

I claim:

1. Beam former control apparatus for multi-transducer array antenna comprising:

a delay circuit for generating a delay or phase shift control signal for each transducer, each delay circuit comprising a first digital apparatus for receiving one or a pair of signals representative of a target direction relative to a predetermined reference point and for providing in response thereto a first signal representing a function of an included angle between lines joining the reference point to the corresponding transducer and the same reference point to the target, and a second digital apparatus in circuit communication with the first digital apparatus for receiving the first signal and a second signal representative of the range of the target relative to the reference point and for providing in response thereto an output signal corresponding to said control signal.

2. Apparatus as defined in claim 1 in which each of said digital apparatus is comprised of a a first look-up table for receiving said representative target direction signals as a first look-up table address and in response for reading a corresponding digital word defining said first signal, and a second look-up table for receiving said first signal and said second signal as a second look-up table address and in response for reading a corresponding digital word defining said output signal.

3. Apparatus as defined in claim 1 in which the second look-up table contains more words defining the near field delay values than far field delay values, whereby antenna resolution of the near field is rendered higher than that of the far field.

4. Apparatus as defined in claim 1 in which the look-up tables are comprised of random access memory means.

5. A multi-transducer array antenna comprising:

(a) a plurality of digital time delay means, one corresponding to each transducer, for delaying transmission of a signal therethrough, and including a delay control input, (b) analog to digital converter connected to each transducer for receiving an output signal therefrom, having an output connected to an input of a corresponding time delay means, (c) summing means having inputs connected to the outputs of the time delay means, for receiving output signals of the transducers and for providing a beam output signal of the antenna, and (d) control apparatus for controlling the time delay of each time delay means, each control apparatus comprising a first look-up table for receiving a signal representative of the direction of a target relative to a predetermined reference point and for outputting in response thereto a first signal representative of an included angle between lines joining the reference point to a corresponding transducer and the same reference point to the target, and a second look-up table for receiving the first signal and a second signal representative of the range of the target relative to the reference point and for outputting in response thereto a delay control signal, (e) means for applying the delay control signal to a corresponding delay control input of a corresponding delay means for controlling the delay of transmission of a signal from a corresponding transducer therethrough.

6. An antenna as defined in claim 5 in which the look-up tables for each time delay means are comprised of random access digital memories storing words representative of said first signal and said delay control signals at predetermined address locations, said target direction signals being in the form of a beam direction specification constituting a first digital address for reading a word located at a corresponding address location, said second signal being in the form of a range code specification constituting a second digital address in combination with said first signal for reading a word located at a corresponding address location corresponding to said delay control signal.

7. An antenna as defined in claim 6 in which each time delay means is comprised of a digitally controlled phase-shifter.

8. An antenna as defined in claim 6 in which each time delay means is comprised of a data memory for writing digital signals output from a corresponding analog to digital converter, and for reading the data memory at an address specified by a corresponding delay control signal.

9. An antenna as defined in claim 8 in which the data memory is in the form of a rotating buffer, including means for writing said digital signals at sequential address locations, and means for reading said digital signals therefrom at sequential address locations spaced from writing addresses by an address increment defined by the delay control signal.

10. An antenna as defined in claim 9 including a latch connected to the data output of the second look-up table for temporarily storing the delay control signal for addressing the data memory.

11. A method of controlling the beam direction of a multi-transducer antenna comprising storing first digital words representative of included angles between lines joining a reference point to a transducer and the same reference point to the target, for each transducer in a corresponding look-up table, storing second digital words representing delay control signals corresponding to ranges of a target relative to the reference point for each of said first digital words in a second look-up table associated with the first look-up table for each transducer, addressing each first look-up table with an address signal representing the direction of said target to obtain a corresponding first digital word, addressing each second look-up table with a corresponding first digital word combined with a signal representing the range of the target to obtain a corresponding second digital word, and delaying a signal received by a corresponding transducer an amount represented by the second digital word.

12. A method as defined in claim 11 in which the number of bits in the first digital word is smaller than the number of bits in the address signal representing the direction of the target.

13. A methOd as defined in claim 11 including storing the signal received by each transducer at sequentially stored locations, and repeatedly reading the stored signal at locations offset from the storing locations by an amount represented by the second digital word.

14. Apparatus as defined in claim 2 in which the second look-up table contains more words defining the near field delay values than far field delay values, whereby antenna resolution of the near field is rendered higher than that of the far field.

15. Apparatus as defined in claim 2 in which the look-up tables are comprised of random access memory means.

16. A method as defined in claim 12 including storing the signal received by each transducer at sequentially stored locations, and repeatedly reading the stored signal at locations offset from the storing locations by an amount represented by the second digital word.

* * * * *